(12) United States Patent
Su et al.

(10) Patent No.: US 11,086,363 B2
(45) Date of Patent: Aug. 10, 2021

(54) DISPLAY PANEL, DISPLAY APPARATUS, AND FOLDABLE DISPLAY APPARATUS

(71) Applicant: Shanghai AVIC OPTO Electronics Co., Ltd., Shanghai (CN)

(72) Inventors: Shihu Su, Shanghai (CN); Tianqing Hu, Shanghai (CN); Zhaokeng Cao, Shanghai (CN)

(73) Assignee: Shanghai AVIC OPTO Electronics Co., Ltd., Shanghai (CN)

( * ) Notice: Subject to any disclaimer, the term of this patent is extended or adjusted under 35 U.S.C. 154(b) by 55 days.

(21) Appl. No.: 16/232,477

(22) Filed: Dec. 26, 2018

(65) Prior Publication Data

US 2020/0103942 A1    Apr. 2, 2020

(30) Foreign Application Priority Data

Sep. 29, 2018   (CN) .......................... 201811151082.4

(51) Int. Cl.
*G06F 1/16* (2006.01)
*G06F 3/14* (2006.01)

(52) U.S. Cl.
CPC .......... *G06F 1/1652* (2013.01); *G06F 1/1649* (2013.01); *G06F 3/1446* (2013.01)

(58) Field of Classification Search
CPC ..... G06F 1/1652; G06F 1/1649; G06F 3/1446
See application file for complete search history.

(56) References Cited

U.S. PATENT DOCUMENTS

| | | | | |
|---|---|---|---|---|
| 2007/0279315 A1* | 12/2007 | Laves | ................. | H04M 1/0247 345/1.1 |
| 2014/0101578 A1* | 4/2014 | Kwak | ................... | G06F 1/1647 715/761 |
| 2015/0153778 A1* | 6/2015 | Jung | ....................... | G09G 5/37 345/156 |
| 2016/0044808 A1* | 2/2016 | Mitsui | ................... | G06F 1/1616 361/679.01 |
| 2016/0179229 A1* | 6/2016 | Ahn | ..................... | G06F 3/04164 345/173 |
| 2017/0139442 A1* | 5/2017 | Yoshizumi | .......... | H04M 1/0268 |
| 2017/0330925 A1* | 11/2017 | Tang | ................... | H01L 51/0097 |
| 2018/0068613 A1* | 3/2018 | Chung | ................ | G09G 3/2983 |

FOREIGN PATENT DOCUMENTS

| | | |
|---|---|---|
| CN | 102855821 A | 1/2013 |
| CN | 105068341 A | 11/2015 |
| CN | 105374291 A | 3/2016 |
| CN | 205229608 U | 5/2016 |
| CN | 105932036 A | 9/2016 |
| CN | 106783917 A | 5/2017 |

(Continued)

*Primary Examiner* — Shaheda A Abdin
(74) *Attorney, Agent, or Firm* — Anova Law Group, PLLC

(57) ABSTRACT

A display panel includes a first display area and a second display area. The first display area includes a planar area and a bending area. The first display area and the second display area are arranged along a first direction. The planar area and the second display area are arranged at opposite sides of the bending area along the first direction. A maximum length of the planar area along a second direction is greater than a minimum length of the second display area along the second direction. The first direction intersects the second direction.

20 Claims, 20 Drawing Sheets

(56) References Cited

FOREIGN PATENT DOCUMENTS

| | | |
|---|---|---|
| CN | 106935144 A | 7/2017 |
| CN | 206422068 U | 8/2017 |
| CN | 206546568 U | 10/2017 |
| CN | 107728901 A | 2/2018 |
| CN | 107731151 A | 2/2018 |
| CN | 108417606 A | 8/2018 |
| CN | 108563286 A | 9/2018 |

\* cited by examiner

DISPLAY PANEL, DISPLAY APPARATUS, AND FOLDABLE DISPLAY APPARATUS

CROSS-REFERENCE TO RELATED APPLICATION

This application claims the priority to Chinese Application No. 201811151082.4, filed on Sep. 29, 2018, the entire contents of which are incorporated herein by reference.

TECHNICAL FIELD

The present disclosure relates to display technology and, more particularly, to a display panel, a display apparatus, and a foldable display apparatus.

BACKGROUND

Among the human sensory organs, the visual organ (eyes) receives the most information. Rich visual information are increasingly needed nowadays. The display technology thus plays a very important role in today's human society. Since the emergence of display technology, the display technology has developed very rapidly. Cathode ray tube (CRT) technology, plasma display panel (PDP) technology, liquid crystal display (LCD) technology, and even the latest organic light-emitting diode (OLED) display technology and micro light-emitting diode (micro LED) display technology have appeared one after another.

Today's display technologies are rapidly moving toward a direction of narrow border, high contrast, high resolution, full color display, low power consumption, high reliability, long life, and thin and light. Research on flexible display (soft screen) technology is also constantly improving and deepening.

Different than traditional flat panel displays, the display panel having a flexible material as the substrate realizes a flexible display, thereby creating a fantastic visual effect. Flexible display panels having bendable properties can be applied to a lot of fields, such as rollable display apparatus, flexible wearable devices, foldable displays, or the like. How to achieve the "full screen" display effect is one of the problems faced by the display industry and is also one of the key research direction of the display industry.

SUMMARY

In accordance with the disclosure, there is provided a display panel including a first display area and a second display area. The first display area includes a planar area and a bending area. The first display area and the second display area are arranged along a first direction. The planar area and the second display area are arranged at opposite sides of the bending area along the first direction. A maximum length of the planar area along a second direction is greater than a minimum length of the second display area along the second direction. The first direction intersects the second direction.

In accordance with the disclosure, there is also provided a display apparatus including a camera component and a display panel. The display panel includes a first display area and a second display area. The first display area includes a planar area and a bending area. The first display area and the second display area are arranged along a first direction. The planar area and the second display area are arranged at opposite sides of the bending area along the first direction. A maximum length of the planar area along a second direction is greater than a minimum length of the second display area along the second direction. The first direction intersects the second direction. When the bending area is in a bent state, the planar area and the second display area overlap each other in a third direction perpendicular to the planar area. The camera component and the second display area are arranged at a same side of the planar area. A lens of the camera component is arranged at a side of the camera component away from the planar area.

In accordance with the disclosure, there is also provided a foldable display apparatus including a display panel. The display panel includes a first display area and a second display area. The first display area includes a planar area and a bending area. The first display area and the second display area are arranged along a first direction. The planar area and the second display area are arranged at opposite sides of the bending area along the first direction. A maximum length of the planar area along a second direction is greater than a minimum length of the second display area along the second direction. The first direction intersects the second direction. In a first state of the foldable display apparatus, the first display area and the second display area of the display panel are arranged at a same plane. In a second state of the foldable display apparatus, when the bending area is in a bent state, the planar area and the second display area overlap each other in a third direction perpendicular to the planar area.

Other aspects of the present disclosure can be understood by those skilled in the art in light of the description, the claims, and the drawings of the present disclosure.

BRIEF DESCRIPTION OF THE DRAWINGS

The drawings are incorporated in the specification as a part of the specification. The drawings illustrate the embodiments of the present disclosure and explain the principle of the present disclosure in connection with the description of the drawings.

DETAILED DESCRIPTION OF THE EMBODIMENTS

Figure 1:
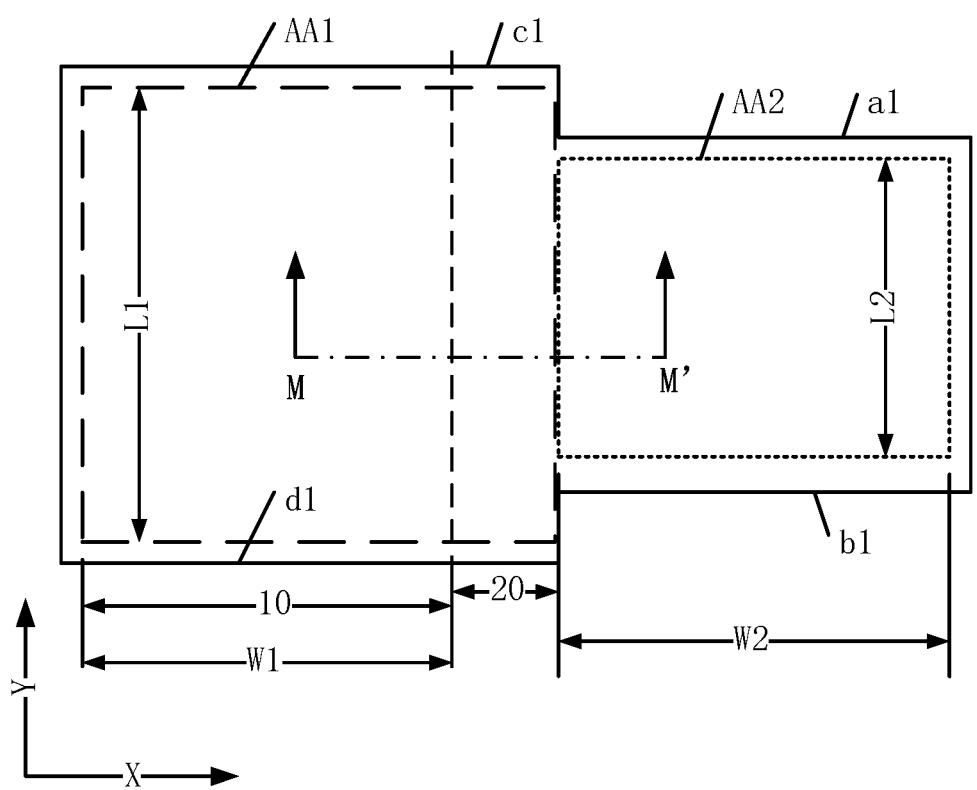
FIG. 1 is a schematic diagram of a planar structure of an exemplary display panel according to an embodiment of the present disclosure.

Various exemplary embodiments of the present disclosure will be described in detail with reference to the drawings. Unless otherwise defined, the relative arrangement, numerical expressions, and numerical values of the components and processes described in the embodiments are not intended to limit the scope of the present disclosure.

The following description of the at least one exemplary embodiment is merely for illustration and not intended to limit the present disclosure.

Techniques, methods, and devices known to those of ordinary skill in the art may not be discussed in detail. However, the techniques, methods, and devices should be considered as a part of the specification when appropriate.

In all of the examples shown and discussed herein, any specific value is merely for illustration and not intended to limit the present disclosure. Therefore, other examples of the exemplary embodiments may have different values.

It will be appreciated that similar reference numerals and letters indicate similar components in the drawings. Therefore, a component defined in a drawing will not be further discussed in the subsequent drawings.

A display panel, a display apparatus, and a foldable display apparatus consistent with the disclosure will be described below. The display panel can include a first display area and a second display area. The first display area can include a planar area and a bending area. The first display area and the second display area can be arranged along a first direction. The planar area and the second display area can be arranged at opposite sides of the bending area along the first direction. A maximum length of the planar area along a second direction can be greater than a minimum length of the second display area along the second direction. The first direction can intersect the second direction. When the display panel is arranged at a display apparatus, the display panel at a side of the second display area can have a shelf space for arranging electronic elements/devices in the display apparatus. As such, the electronic elements/devices and the display panel can be highly integrated and the electronic elements/devices in the display apparatus do not occupy the space of the display panel on the side of the planar area, such that the display panel at the side of the planar area can realize the technical effect of a full screen for display.

FIG. 1 is a schematic diagram of a planar structure of a display panel consistent with the disclosure. As shown in FIG. 1, the display panel includes a first display area AA1 and a second display area AA2.

The first display area AA1 includes a planar area 10 and a bending area 20.

The first display area AA1 and the second display area AA2 are arranged along a first direction X. The planar area 10 and the second display area AA2 are arranged at opposite sides of the bending area 20 along the first direction X.

A maximum length of the planar area 10 along a second direction Y is L1, and a minimum length of the second display area AA2 along the second direction Y is L2, where L2<L1. The first direction X intersects the second direction Y.

In the present embodiment, the display panel has two display areas, i.e., the first display area AA1 and the second display area AA2. The display areas can have a display function for displaying image information. For example, a plurality of pixels (not shown in FIG. 1) may be included in the display areas.

The first display area AA1 includes the planar area 10 and the bending area 20. The planar area 10 is in a flat state, and the bending area 20 has a bendable function. In some embodiments, the display panel can be made of a flexible material that is resistant to bending.

The planar area 10, the bending area 20, and the second display area AA2 are sequentially arranged along the first direction X. In some embodiments, the second display area AA2 can be in the flat state.

The lengths of the planar area 10 and the second display area AA2 are not identical. For example, the maximum length L1 of the planar area 10 along the second direction Y can be longer, and the minimum length L2 of the second display area AA2 along the second direction Y can be shorter, where L2<L1. Since the length of the second display area AA2 is shorter, when the display panel is arranged at a display apparatus, the display panel at a side of the second display area AA2 can have a shelf space for arranging electronic elements/devices in the display apparatus. As such, the electronic elements/devices and the display panel can be highly integrated and the electronic elements/devices in the display apparatus do not occupy the space of the display panel on the side of the planar area 10, such that the display panel at the side of the planar area 10 can realize the technical effect of a full screen for display.

It can be appreciated that there are various implementation manners causing L2 to be shorter than L1. Exemplary embodiments will be described below.

FIG. 1 takes the rectangle as an example of shapes of the planar area 10 and the second display area AA2. The display panel at the side of the second display area AA2 has an edge a1 and an edge b1 arranged opposite to each other, and the display panel at the side of the first display area AA1 has an edge c1 and an edge d1 arranged opposite to each other. The edge a1 and the edge b1 are arranged at opposite sides of the second display area AA2 along the second direction Y, and the edge c1 and the edge d1 are arranged at opposite sides of the first display area AA1 along the second direction Y. The edge a1 is not aligned with the edge c1, and the edge b1 is not aligned with the edge d1.

Figure 2:
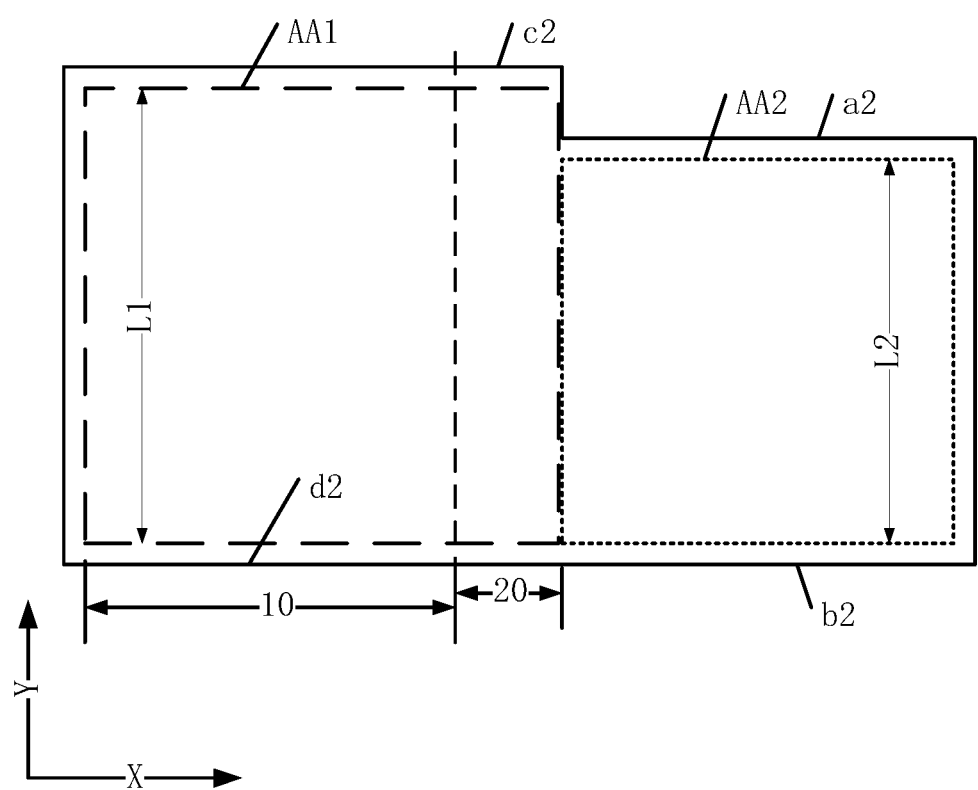
FIG. 2 is a schematic diagram of a planar structure of another exemplary display panel according to an embodiment of the present disclosure.

FIG. 2 is a schematic diagram of a planar structure of a display panel consistent with various embodiments of the present disclosure. FIG. 2 takes the rectangle as an example of the shapes of the planar area 10 and the second display area AA2. A difference between the FIG. 2 and the FIG. 1 lies in that the edge a1 is not aligned with the edge c1 but the edge b1 is aligned with the edge d1.

Figure 3:
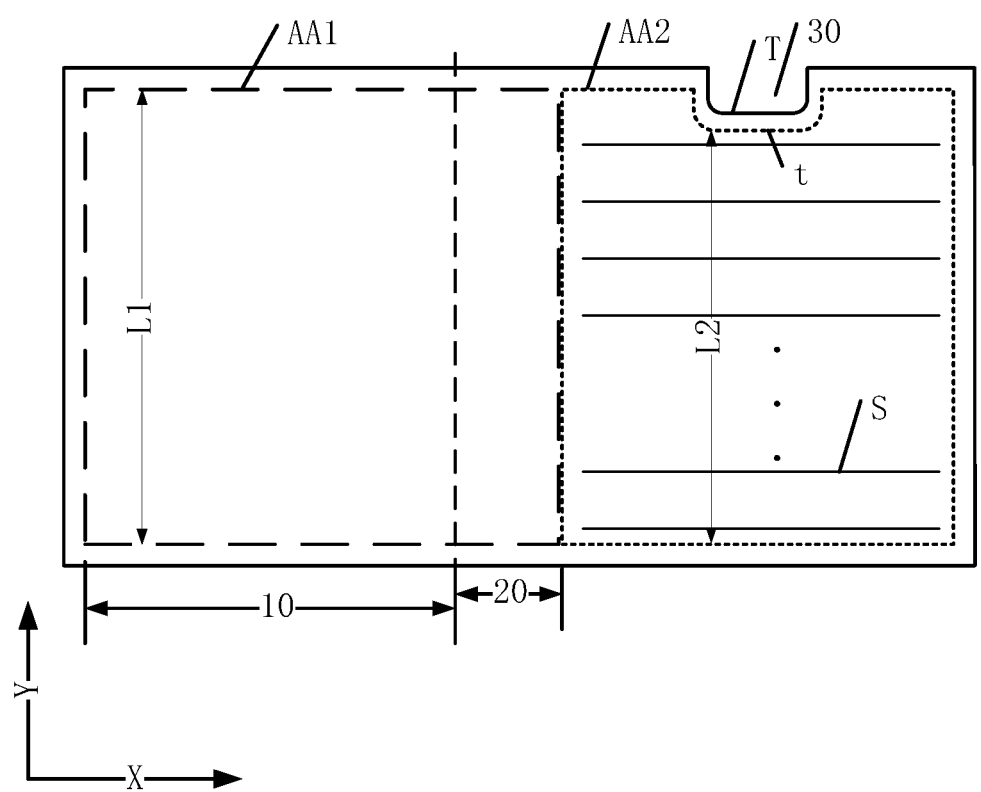
FIG. 3 is a schematic diagram of a planar structure of another exemplary display panel according to an embodiment of the present disclosure.

FIG. 3 is a schematic diagram of a planar structure of a display panel consistent with the disclosure. In some embodiments, as shown in FIG. 3, the display panel includes a profiled edge T. The second display area AA2 includes a plurality of data lines S. The plurality of data lines S and the profiled edge T extend in the first direction X. The profiled edge T is recessed toward an inside of the second display area AA2 to form a first notch 30. A section of an edge t of the second display area AA2 is recessed inward to adapt to the shape of the first notch 30. The second display area AA2 half surrounds the first notch 30. Since the section of the edge t of the second display area AA2 is recessed inward, the minimum length L2 of the second display area AA2 is shorter than the maximum length L1 of the planar area 10. In the present embodiment, the display panel has the first notch 30. When the display panel is arranged at the display apparatus of a terminal, the electronic elements/devices in the display apparatus can be arranged in the first notch 30. As such, the electronic elements/devices and the display panel can be highly integrated in the display apparatus and the electronic elements/devices in the display apparatus do not occupy the space of the display panel at the side of the planar area 10, such that the display panel at the side of the planar area 10 can realize the technical effect of the full screen for display.

Figure 4:
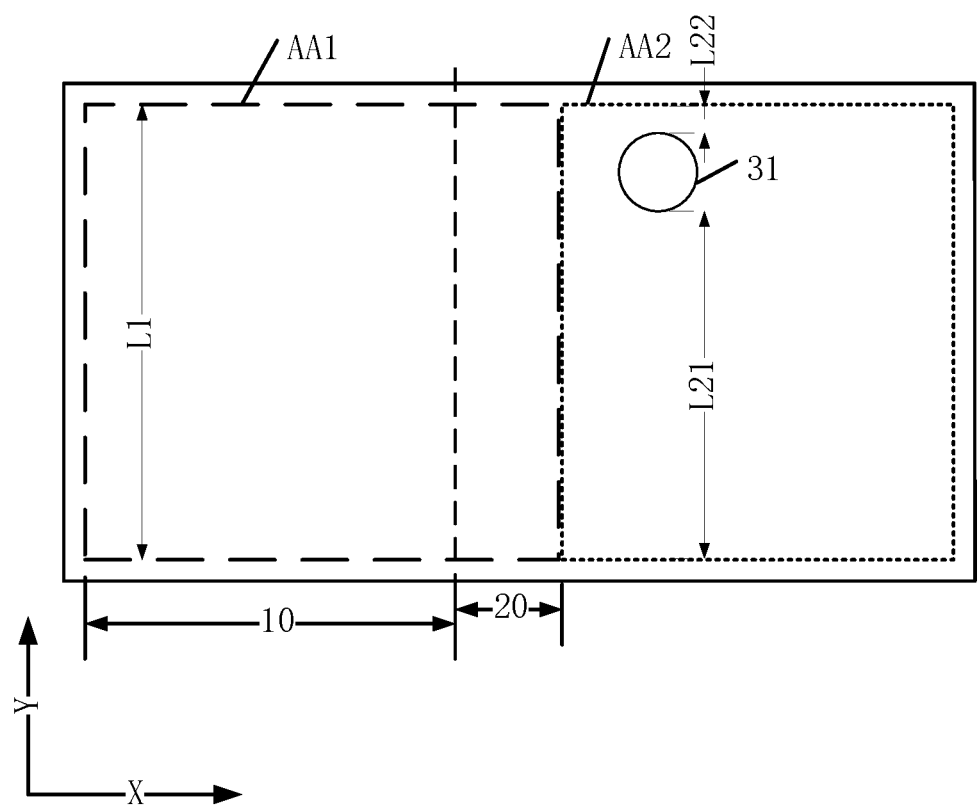
FIG. 4 is a schematic diagram of a planar structure of another exemplary display panel according to an embodiment of the present disclosure.

FIG. 4 is a schematic diagram of a planar structure of a display panel consistent with the disclosure. In some embodiments, as shown in FIG. 4, the display panel includes a hollow part 31, and the second display area AA2 surrounds the hollow part 31. The hollow part 31 penetrates the display panel in a thickness direction of the display panel. When the display panel is arranged at the display apparatus of the terminal, the electronic elements/devices in the display apparatus can be arranged in the hollow part 31. As such, the electronic elements/devices and the display panel can be highly integrated in the display apparatus and the electronic elements/devices in the display apparatus do not occupy the space of the display panel at the side of the planar area 10, such that the display panel at the side of the planar area 10 can realize the technical effect of the full screen for display. FIG. 4 takes the rectangle as an example of the shapes of the planar area 10 and an outer contour of the second display area AA2 for illustration. The second display area AA2 surrounds the hollow part 31, and the hollow part 31 is a non-display area, such that a length of the hollow part 31 should be removed when calculating the minimum length L2 of the second display area AA2. The non-display area refers to an area that is not for display. The lengths of the second display area AA2 at two sides of the hollow part 31 are L21 and L22, respectively, and the second display area AA2 has the minimum length $L2=L21+L22$. The minimum length L2 of the second display area AA2 is smaller than the maximum length L1 of the planar area 10.

It can be appreciated that FIGS. 1 to 4 provide exemplary embodiments for illustrating the specific implementation manners in which L2 can be shorter than L1. It can be appreciated by those skilled in the art that there are many other implementation manners in which L2 can be shorter than L1, and detailed description will be omitted herein.

In some embodiments, as shown in FIG. 1, a maximum width of the planar area 10 along the first direction X is W1, and the maximum width of the second display area AA2 along the first direction X is W2, where W1=W2.

In the present embodiment, the planar area 10 and second display area AA2 are arranged at two sides of the bending area 20 along the first direction X. The bending area 20 can be arranged in the middle of the display panel. The width of the display area at two sides of the bending area 29 can be the same or approximately the same.

It will be appreciated by those skilled in the art that W1 and W2 may not be strictly the same due to a precision of the manufacturing process, and the values of W1 and W2 can have reasonable errors.

Figure 5:
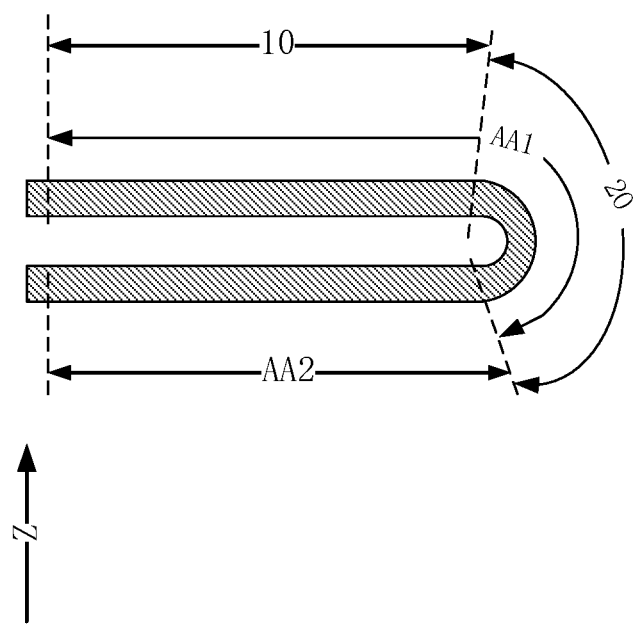
FIG. 5 is a schematic diagram of a cross-sectional structure of the display panel in FIG. 1 in a bent state according to an embodiment of the present disclosure.

FIG. 5 is a schematic diagram of a cross-sectional structure of the display panel in FIG. 1 in a bent state. In some embodiments, as shown in FIGS. 1 and 5, a direction perpendicular to the planar area 10 is a third direction Z. When the bending area 20 is in the bent state, the planar area 10 and the second display area AA2 overlap each other in the third direction Z.

According to the present disclosure, the display panel can be a bendable display panel. The bending area 20 can be in the bent state, such that the planar area 10 and the second display area AA2 can be overlapped in the third direction Z, and the display panel can be in a folded state.

When the display panel is arranged at the display apparatus, the technical effect of double-sided display can be achieved. The double-sided display technology can bring a richer user experience, and cause the display apparatus to realize more functions. The double-sided display is one of the development directions of the display apparatus.

Figure 6:
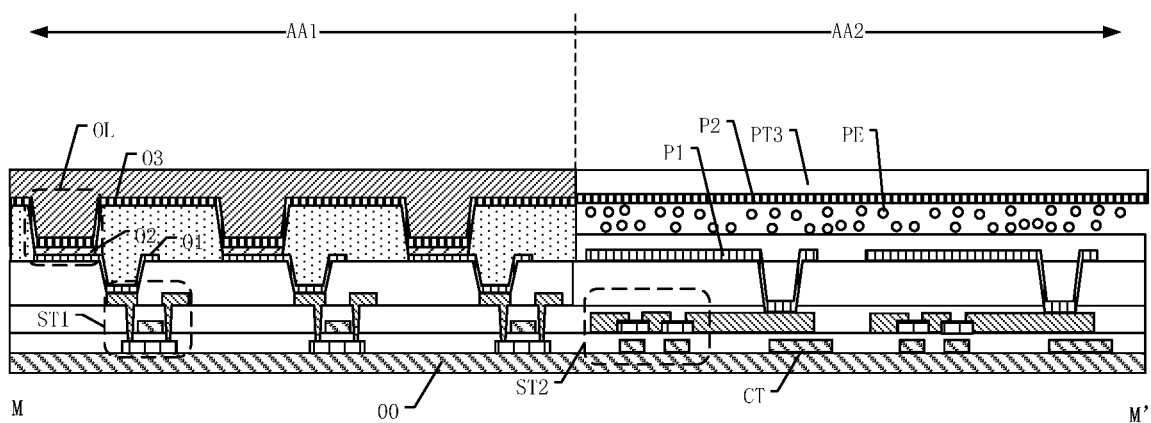
FIG. 6 is a schematic diagram of a cross-sectional structure of the display panel along a line MINI' in FIG. 1 according to an embodiment of the present disclosure.

FIG. 6 is a schematic diagram of a cross-sectional structure of the display panel along a line MM' in FIG. 1. In some embodiments, as shown in FIGS. 1 and 6, a part of the display panel in the first display area AA1 includes an organic light-emitting display (OLED) panel, and at least a part of the display panel in the second display area AA2 includes an electrophoretic display panel. The first display area AA1 and the second display area AA2 share a same substrate 00.

In some embodiments, the substrate 00 can be made of a resin material.

The first display area AA1 includes a first thin film transistor ST1 arranged on the substrate 00, and the organic light-emitting diode OL. The organic light-emitting diode OL includes an anode O1, a cathode O3, and a luminescent material O2 arranged between the anode O1 and the cathode O3.

The second display area AA2 includes a second thin film transistor ST2 arranged on the substrate 00, a pixel electrode P1, an electrophoretic film PE, a common electrode P2, and a protective film P3.

In some embodiments, the display panel further includes a plurality of insulating layers and detailed description are omitted herein.

In some embodiments, the display panels at the second display area AA2 may all be electrophoretic display panels, or may partially be electrophoretic display panels.

According to the present disclosure, the display panel can use the organic light emitting display technology and the electrophoretic display technology. The organic light-emitting display panel uses the OLED as a light-emitting component, and the OLED is also referred to as an organic electro-laser display or an organic light-emitting semiconductor. The OLED is founded in the laboratory in 1979 by Chinese-American professor Ching W. Tang. The OLED display technology has the advantages of self-illumination, wide view angle, almost infinite contrast, low power consumption, extremely high reaction speed, and the like.

Electrophoretic display technology (E-Paper) is a display technology early developed for paper-based displays. Electrophoretic display technology applies an electric field to cause the charged balls having different colors to move in a liquid environment to display different colors. The electrophoresis technology has the following advantages. Firstly, the electrophoresis technology has low power consumption. Due to the bi-stability, an image can be retained on the display for a few days or months after the power has been turned off. Secondly, the display produced using the electrophoresis technology is a type of a reflective display, such that the display has good readability under sunlight and can also be used under dark environments by combining the front light or side light. Thirdly, the electrophoresis technology has low production costs, because tightly sealing is not required and solution processing techniques, e.g., printing, can be used. Fourthly, the electrophoretic displays feature flexible form factor that allows the electrophoretic displays to be fabricated on the surface of plastic, metal, or glass, and hence the electrophoretic displays are the best choice for flexible display technology.

In the second display area AA2, the electrophoretic display panel can be used to display time, date, weather, mobile phone signal, power, and/or other information, to save power, improve endurance, and improve user experience.

Display panels produced using organic light-emitting display technology and electrophoretic display technology can be fabricated using flexible materials, thereby providing display panels with bendable properties.

Figure 7:
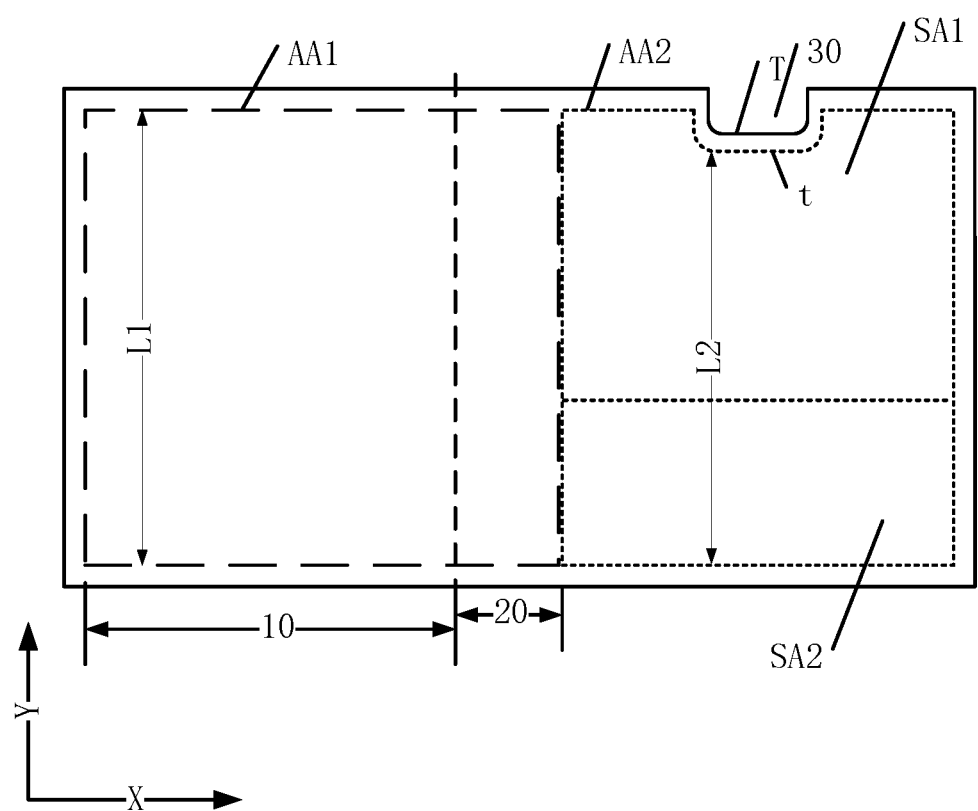
FIG. 7 is a schematic diagram of a planar structure of another exemplary display panel according to an embodiment of the present disclosure.

FIG. 7 is a schematic diagram of a planar structure of a display panel consistent with the disclosure. In some embodiments, as shown in FIG. 7, the second display area AA2 includes a first sub-area SA1 and a second sub-area SA2. The first sub-area SA1 and the second sub-area SA2 are arranged along the second direction Y.

A part of the display panel in the first sub-area SA1 includes the organic light-emitting display panel, and a part of the display panel in the second sub-area SA2 includes the electrophoretic display panel.

In the present embodiment, only a part of the display panel in the second display area AA2 includes the electrophoretic display panel. The second sub-area SA2 can use the electrophoretic display panel to display time, date, weather, mobile phone signal, power, and/or other information to save power and improve the user experience.

Figure 8:
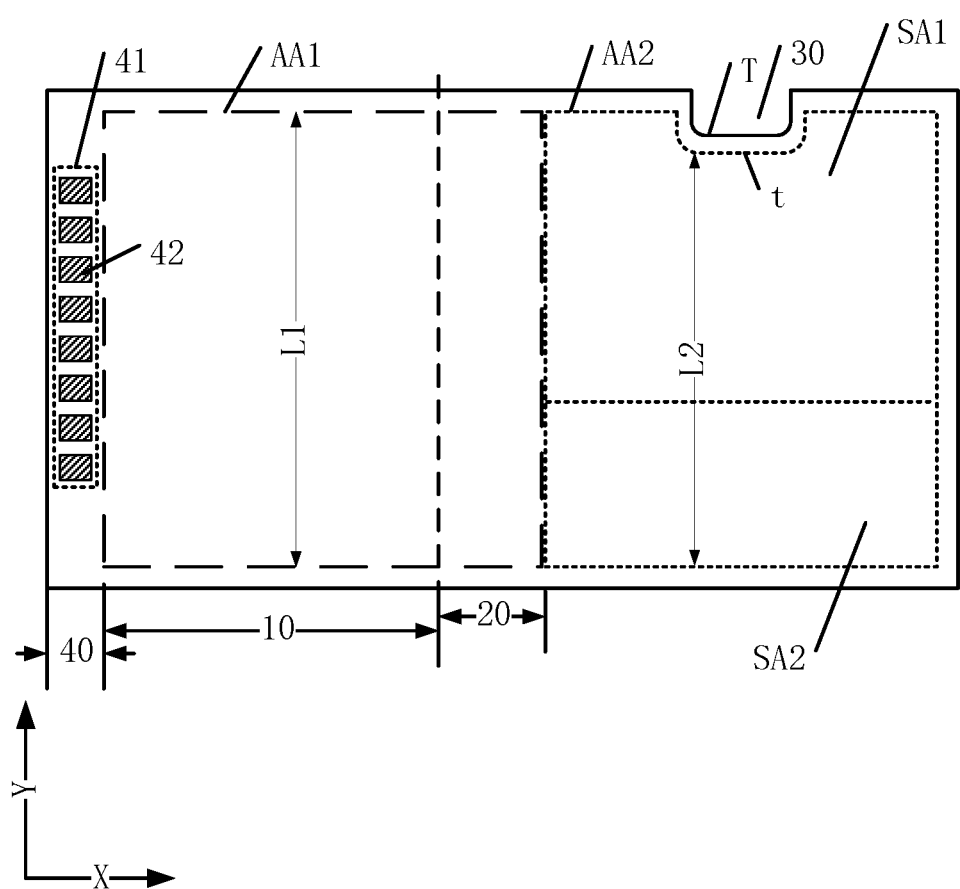
FIG. 8 is a schematic diagram of a planar structure of another exemplary display panel according to an embodiment of the present disclosure.

FIG. 8 is a schematic diagram of a planar structure of a display panel consistent with the disclosure. In some embodiments, as shown in FIG. 8, the display panel also includes a stepped area 40. The stepped area 40 and the bending area 20 are arranged at opposite sides of the planar area 10 in the first direction X.

The stepped area 40 includes a bonding area 41. The bonding area 41 includes a plurality of conductive pads 42.

In the present embodiment, the bonding area 41 can be used to bond a chip or a flexible circuit board with the display panel. The chip or flexible circuit board can transmit electrical signals to the display panel. In some embodiments, the chip or flexible circuit board can be electrically connected to the plurality of conductive pads 42 by an anisotropic conductive paste. In some embodiments, each line of the first display area AA1 and the second display area AA2 can be electrically connected to the bonding area 41. According to the disclosure, only one bonding area 41 is provided can reduce an area of the non-display area in the display panel, thereby further facilitating the technical effect of the full screen for display.

Figure 9:
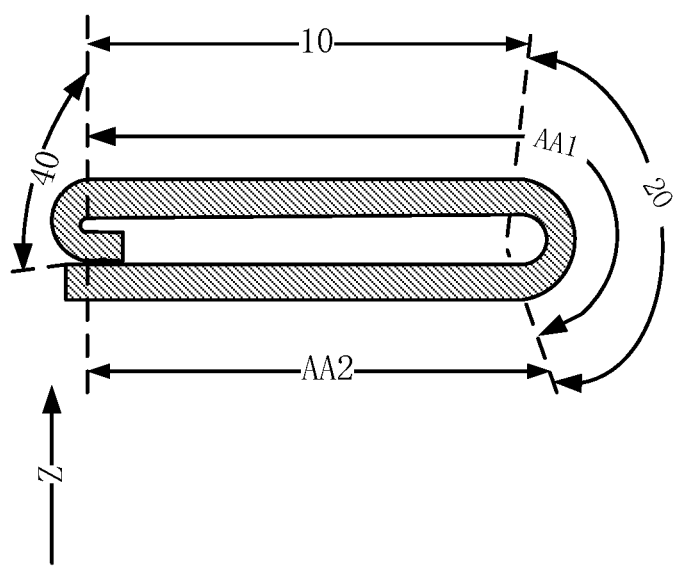
FIG. 9 is a schematic diagram of a cross-sectional structure of the display panel in FIG. 8 in a bent state according to an embodiment of the present disclosure.

FIG. 9 is a schematic diagram of a cross-sectional structure of the display panel in FIG. 8 consistent with the disclosure. In some embodiments, as shown in FIGS. 8 and 9, the direction perpendicular to the planar area 10 is the third direction Z. When the stepped area 40 is in the bent state, a part of the stepped area 40 and the planar area 10 overlap in the third direction Z.

In some embodiments, the stepped area 40 can be bent to a back side of the display panel without affecting a normal display effect of the display panel, thereby further facilitating the technical effect of the full screen for display.

Figure 10:
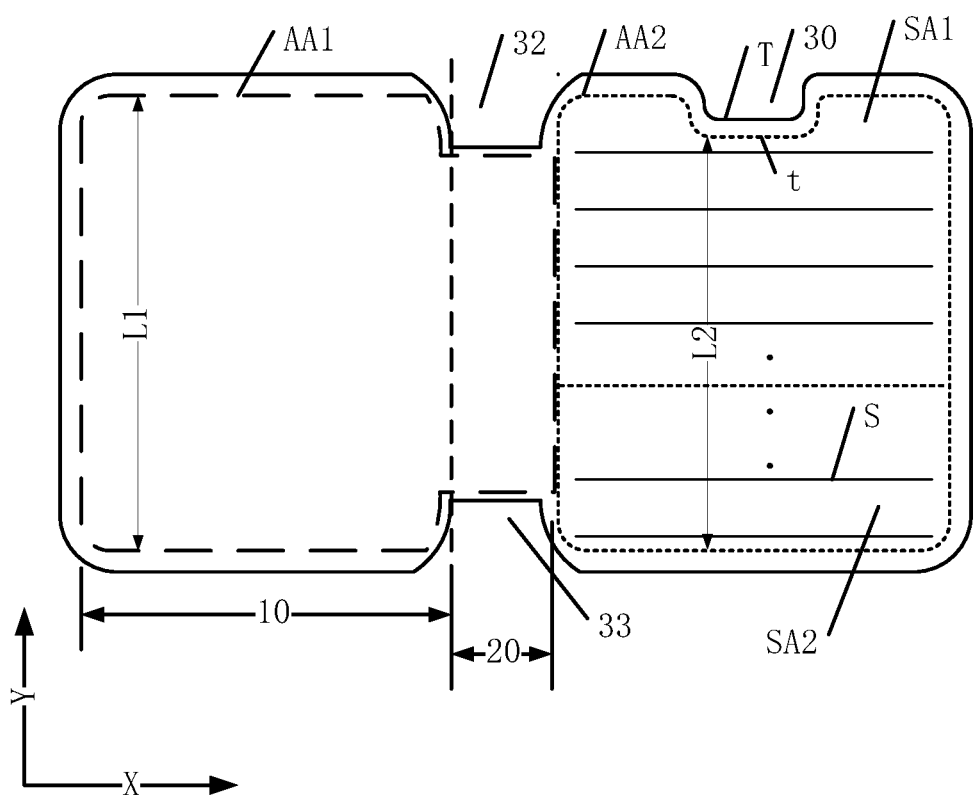
FIG. 10 is a schematic diagram of a planar structure of another exemplary display panel according to an embodiment of the present disclosure.
Figure 11:
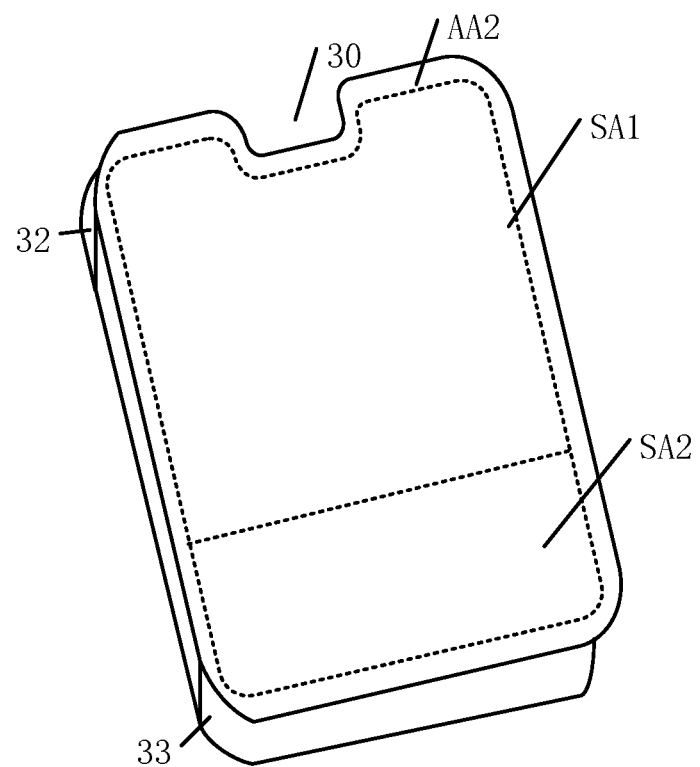
FIG. 11 is a schematic diagram of a spatial structure of the display panel in FIG. 10 in a bent state according to an embodiment of the present disclosure.

FIG. 10 is a schematic diagram of a planar structure of a display panel consistent with the disclosure. FIG. 11 is a schematic diagram of a spatial structure of the display panel in FIG. 10 in a bent state. In some embodiments, as shown in FIGS. 10 and 11, the display panel includes a second notch 32 and a third notch 33. The second notch 32 and the third notch 33 penetrate the display panel in the thickness direction of the display panel.

The second notch 32 and the third notch 33 are arranged at opposite sides of the bending area 20 in the second direction Y.

FIG. 10 is a view of the display panel viewed in a direction perpendicular to the plane of the display panel. The thickness direction of the display panel is the direction perpendicular to the plane of the display panel.

In the present embodiment, the second notch 32 and the third notch 33 are respectively arranged at the two sides of the bending area 20 along the second direction Y, such that the bending area 20 can be more easily bent. In some embodiments, corners of the display panel are rounded to help enhance the user experience. When the display panel is arranged at the display apparatus, the arrangement of the second notch 32 and the third notch 33 can cause the bent display panel to be easier to conform to an outer shape of the display apparatus.

Figure 12:
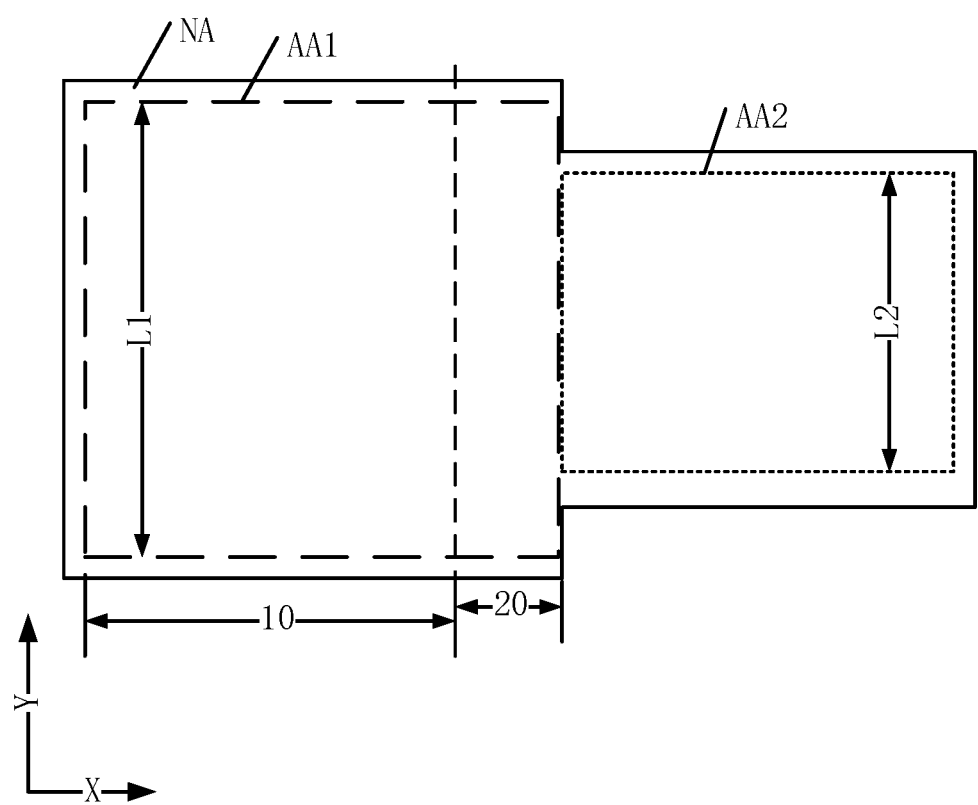
FIG. 12 is a schematic diagram of a planar structure of another exemplary display panel according to an embodiment of the present disclosure.

FIG. 12 is a schematic diagram of a planar structure of a display panel consistent with the disclosure. In some embodiments, as shown in FIG. 12, the display panel includes a non-display area NA. The non-display area NA is arranged around the first display area AA1 and the second display area AA2.

The area of the first display area AA1 is S1, the area of the second display area AA2 is S2, and the area of the non-display area NA is S3, where $S1+S2/S1+S2+S3 \geq 95\%$.

According to the disclosure, a sum of the areas of the first display area AA1 and the second display area AA2 can reach a screen ratio of more than 95%, and the area of the non-display area NA is less than 5%, thereby facilitating to realize the display panel of an ultra-narrow frame. When the display panel is arranged at the display apparatus, the realization of the technical effect of the full screen for display can be facilitated.

Figure 13:
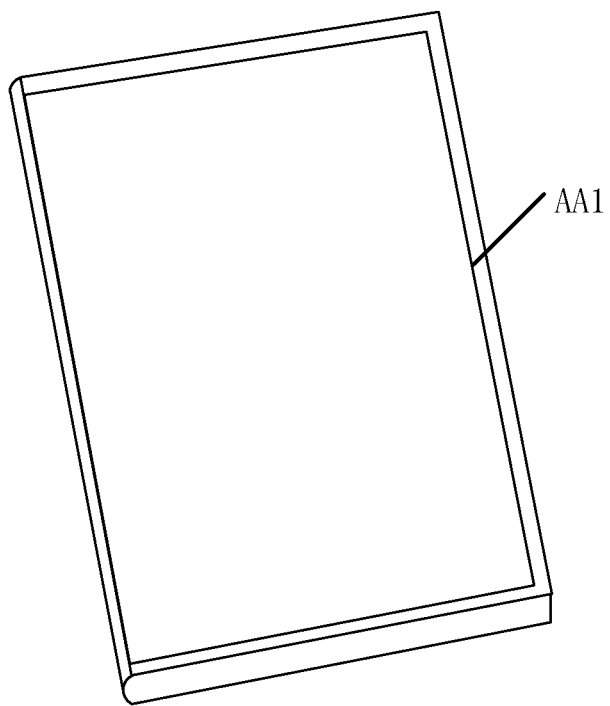
FIG. 13 is a schematic diagram of a spatial structure from side A of an exemplary display apparatus according to an embodiment of the present disclosure.
Figure 14:
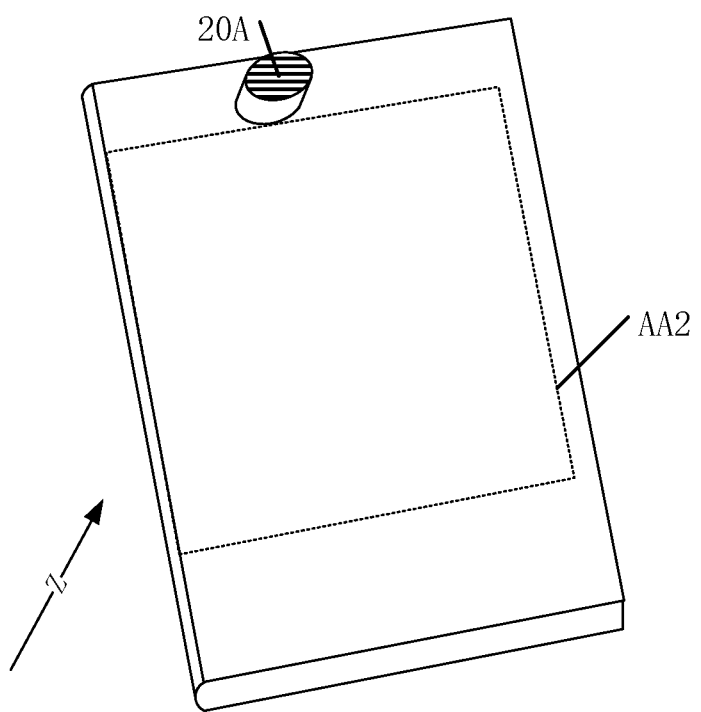
FIG. 14 is a schematic diagram of a spatial structure from side B of an exemplary display apparatus according to an embodiment of the present disclosure.

FIG. 13 is a schematic diagram of a spatial structure from side A of a display apparatus consistent with the disclosure. FIG. 14 is a schematic diagram of a spatial structure from side B of the display apparatus consistent with the disclosure. As shown in FIGS. 1, 13, and 14, the display apparatus includes a display panel 100 and a camera component 200.

The display panel 100 includes the first display area AA1 and the second display area AA2.

The first display area AA1 includes the planar area 10 and the bending area 20.

The first display area AA1 and the second display area AA2 are arranged along the first direction X. The planar area 10 and the second display area AA2 are arranged at opposite sides of the bending area 20 along the first direction X.

The maximum length of the planar area 10 along the second direction Y is L1, and the minimum length of the second display area AA2 along the second direction Y is L2, where L2<L1. The first direction X intersects the second direction Y.

The direction perpendicular to the planar area 10 is the third direction Z.

When the bending area 20 is in the bent state, the planar area 10 and the second display area AA2 overlap each other in the third direction Z, the camera component 200 and the second display area AA2 are arranged at the same side of the planar area 10, and a lens 20A of the camera component 200 is arranged at a side of the camera component 200 distal from the planar area 10.

According to the disclosure, the first display area AA1 and the second display area AA2 have display functions for displaying image information. For example, the first display area AA1 and the second display area AA2 can respectively include a plurality of pixels (not shown in FIGS. 13 and 14).

The first display area AA1 includes the planar area 10 and the bending area 20. The planar area 10 is in the flat state, and the bending area 20 has the bendable function. In some embodiments, the display panel can be made of the flexible material that is resistant to bending.

The lengths of the planar area 10 and the second display area AA2 are not identical. For example, the maximum length L1 of the planar area 10 along the second direction Y can be longer, and the minimum length L2 of the second display area AA2 along the second direction Y can be shorter, where L2<L1. Take the rectangle as an example of the shapes of the planar area 10 and the second display area AA2. The display panel at the side of the second display area AA2 has the edge a1 and the edge b1 arranged opposite to each other, and the display panel at the side of the first display area AA1 has the edge c1 and the edge d1 arranged opposite to each other. The edge a1 and the edge b1 are arranged at opposite sides of the second display area AA2 along the second direction Y, and the edge c1 and the edge d1 are arranged at opposite sides of the first display area AA1 along the second direction Y. The edge a1 is not aligned with the edge c1, and the edge b1 is not aligned with the edge d1.

Since the length of the second display area AA2 is shorter, when the display panel is arranged at the display apparatus, the display panel at the side of the second display area AA2 can have the shelf space for the camera component 200. As such, the camera component 200 and the display panel can be highly integrated in the display apparatus and the camera component 200 in the display apparatus does not occupy the space of the display panel on the side of the planar area 10, such that the display panel at the side of the planar area 10 can realize the technical effect of the full screen for display.

The display apparatus consistent with the disclosure can include any display panel described in FIGS. 1 to 12. The FIGS. 13 and 14 take a mobile phone as an example to illustrate the display apparatus. The mobile phone in the present embodiment has double-sided display function, FIG. 13 shows the side A of the mobile phone, and FIG. 14 shows the side B of the mobile phone. The side A of the mobile phone has a full screen display effect, and the side B of the mobile phone integrates the camera component 200. The side A or the side B can be used according to specific requirements and scenarios, thereby satisfying the diverse needs of the users and improving the user experience.

In some embodiments, a part of the display panel in the first display area AA1 can include the OLED panel, and at least a part of the display panel in the second display area AA2 can include the electrophoretic display panel. Since the power consumption of the electrophoretic display panel is low, when the user uses only the side B of the display apparatus, the power consumption of the display apparatus can be reduced.

It can be appreciated by those skilled in the art that the display apparatus consistent with the disclosure can be the double-sided display apparatus having the display function, such as a computer, which is not intended to be limited by the present disclosure. The display apparatus consistent with the disclosure has the beneficial effects of the display panel consistent with the disclosure. Reference can be made to the detailed description of the display panel in the foregoing embodiments, and details are omitted here.

In some embodiments, as shown in FIGS. 1, 13, and 14, the display apparatus has a first mode and a second mode.

In the first mode, the first display area AA1 is in a display state, and the second display area AA2 is in a non-display state.

In the second mode, the first display area AA1 is in the non-display state, and the second display area AA2 is in the display state.

The present embodiment takes the mobile phone as an example of the display apparatus. In the first mode, the first display area AA1 can be in the display state, and the user can use the side A to view pictures, videos, or the like, displayed in the first display area AA1. The second display area AA2 does not perform the display function.

In the second mode, the second display area AA2 can be in the display state, and the user can use the side B to view pictures, videos, or the like, displayed in the second display area AA2. The first display area AA1 does not perform the display function.

In some embodiments, the second mode can be a photographing mode or a chat mode. When the display apparatus enables the camera component 200 to perform a photographing function, the user can observe the second display area AA2 to complete a selfie.

When the user is chatting, the second display area AA2 can be in the display state to display text and image information, and the first display area AA1 can be in the non-display state to save power consumption of the display apparatus. In some embodiments, a part of the display panel in the first display area AA1 can include the OLED panel, and at least a part of the display panel in the second display area AA2 can include the electrophoretic display panel.

Figure 15:
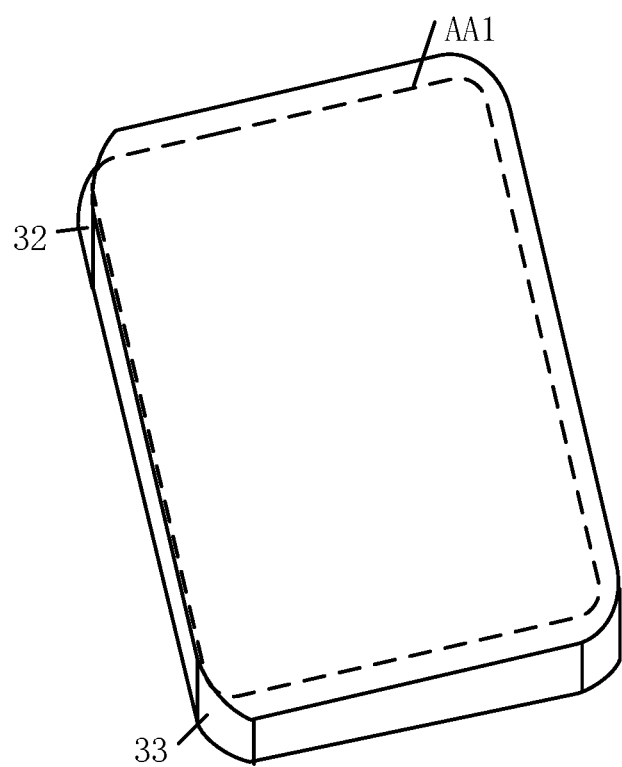
FIG. 15 is a schematic diagram of a spatial structure from side A of another exemplary display apparatus according to an embodiment of the present disclosure.
Figure 16:
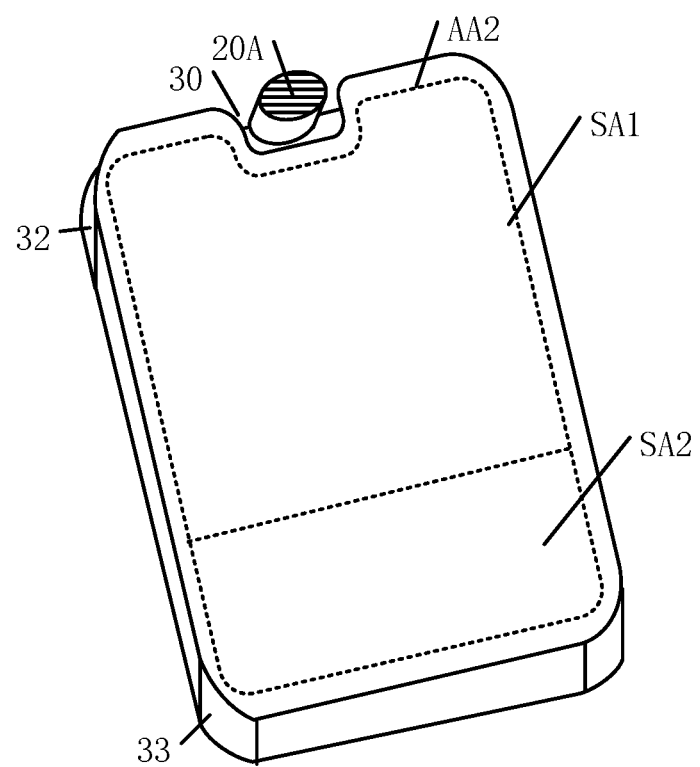
FIG. 16 is a schematic diagram of a spatial structure from side B of another exemplary display apparatus according to an embodiment of the present disclosure.

FIG. 15 is a schematic diagram of a spatial structure from the side A of a display apparatus consistent with the disclosure. FIG. 16 is a schematic diagram of a spatial structure from the side B of the display apparatus consistent with the disclosure.

In some embodiments, as shown in FIGS. 9, 15, and 16, the display panel 100 includes the profiled edge T. The second display area AA2 includes the plurality of data lines S. The plurality of data lines S and the profiled edge T extend in the first direction X.

The profiled edge T is recessed toward the inside of the second display area AA2 to form the first notch 30.

The camera component 200 is arranged in the first notch 30.

In the present embodiment, the section of the edge t of the second display area AA2 is recessed inward to adapt to the shape of the first notch 30. The second display area AA2 half surrounds the first notch 30. Since the section of the edge t of the second display area AA2 is recessed inward, the minimum length L2 of the second display area AA2 is shorter than the maximum length L1 of the planar area 10. In some embodiments, the second notch 32 and the third notch 33 are respectively arranged at the two sides of the bending area 20 along the second direction Y, such that the bending area 20 can be more easily bent.

According to the present embodiment, the display apparatus has the first notch 31 and the camera component 200 can be arranged in first notch 31 of the display apparatus. As such, the camera component 200 and the display panel 100 can be highly integrated in the display apparatus and the camera component 200 in the display apparatus does not occupy the space of the display panel on the side of the planar area 10, such that the display panel 100 at the side of the planar area 10 can realize the technical effect of the full screen for display.

Figure 17:
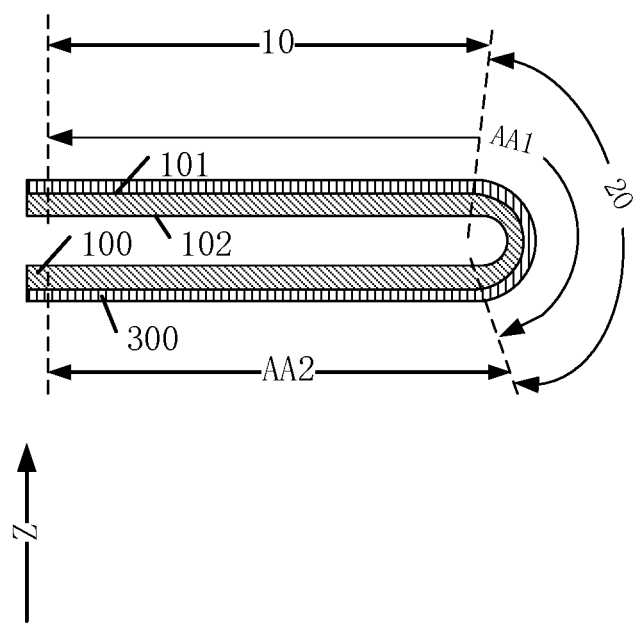
FIG. 17 is a schematic diagram of a cross-sectional structure of another exemplary display apparatus according to an embodiment of the present disclosure.

FIG. 17 is a schematic diagram of a cross-sectional structure of a display apparatus consistent with the disclosure. In some embodiments, as shown in FIG. 17, the display apparatus includes a one-piece molded cover plate 300. The cover plate 300 has a U-shape cross section.

The display panel 100 includes a light-exiting surface 101 and a bottom surface 102 arranged opposite to the light-exiting surface 101. The cover plate 300 is arranged at a side of the light-exiting surface 101 distal from the bottom surface 102, and the cover plate 300 covers the light-exiting surface 101.

Since the display apparatus consistent with the present embodiment is the double-sided display apparatus, the display panel 100 is in the bent state. Accordingly, a shape of the cover plate 300 can be adapted to the shape of the display panel 100 to protect the display panel 100. In the cross-sectional view shown in FIG. 19, the cross section of the cover plate 300 has the U-shape. The cover plate 300 is arranged at the side of the light-exiting surface 101 distal from the bottom surface 102. The light-exiting surface 101 is a side that allows the user to perceive the image when the light enters the user's eyes, and the bottom surface 102 is a side that is not used to implement the display function. Generally, the bottom surface 102 has no light to emit.

According to the present embodiment, the display apparatus is provided with the cover plate 300 that is made of a transparent material and has a certain rigidity for protecting the display panel 100. For example, the material of the cover plate 300 can be a glass or a transparent resin material, which is not intended to be limited in the present disclosure. The cover plate 300 can be one-piece molded, and the one-piece molded structure has good mechanical properties and can avoid the low reliability caused by the splicing.

Figure 18:
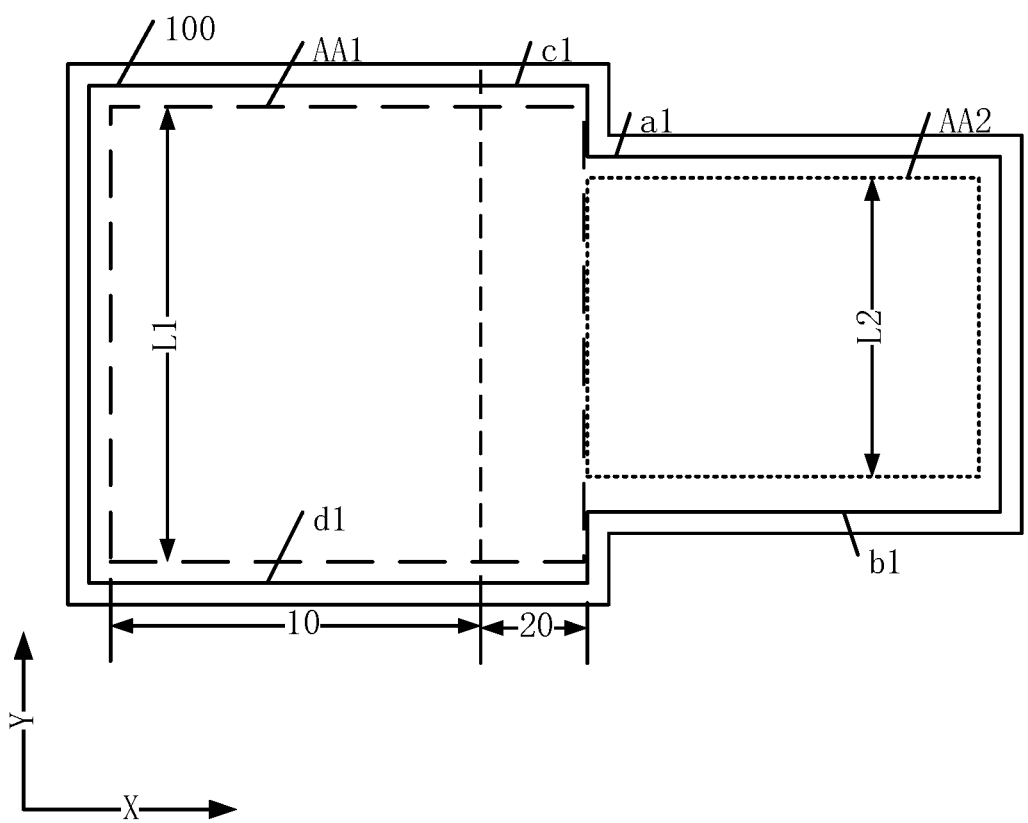
FIG. 18 is a schematic structure diagram of an exemplary foldable display apparatus in a first state according to an embodiment of the present disclosure.
Figure 19:
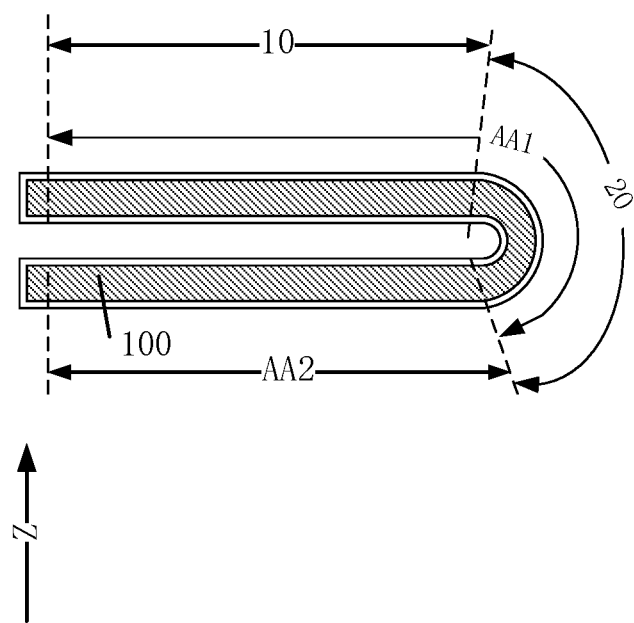
FIG. 19 is a schematic structure diagram of an exemplary foldable display apparatus in a second state according to an embodiment of the present disclosure.

FIG. 18 is a schematic structure diagram of a foldable display apparatus in a first state consistent with the disclosure. FIG. 19 is a schematic structure diagram of the foldable display apparatus in a second state consistent with the disclosure.

As shown in FIGS. 18 and 19, the foldable display apparatus includes the display panel 100.

The display panel 100 includes the first display area AA1 and the second display area AA2.

The first display area AA1 includes the planar area 10 and the bending area 20.

The first display area AA1 and the second display area AA2 are arranged along the first direction X. The planar area 10 and the second display area AA2 are arranged at opposite sides of the bending area 20 along the first direction X.

The maximum length of the planar area 10 along the second direction Y is L1, and the minimum length of the second display area AA2 along the second direction Y is L2, where L2<L1. The first direction X intersects the second direction Y.

The foldable display apparatus has the first state and the second state.

As shown in FIG. 18, in the first state, the first display area AA1 and the second display area AA2 of the display panel 100 are arranged at the same plane.

As shown in FIG. 19, in the second state, the direction perpendicular to the planar area 10 is the third direction Z. The bending area 20 is in the bent state, and the planar area 10 and the second display area AA2 overlap each other in the third direction Z.

The foldable display apparatus consistent with the disclosure can include any display panel described in FIGS. 1 to 12.

It can be appreciated by those skilled in the art that the foldable display apparatus consistent with the disclosure can be the foldable display apparatus having the display function, such as a computer, which is not intended to be limited by the present disclosure. The foldable display apparatus consistent with the disclosure has the beneficial effects of the display panel consistent with the disclosure. Reference can be made to the detailed description of the display panel in the foregoing embodiments, and details are omitted here.

The foldable display apparatus can select the state of the display apparatus according to different usage scenarios. In some embodiments, a part of the display panel in the first display area AA1 can include the OLED panel, and at least a part of the display panel in the second display area AA2 can include the electrophoretic display panel. Since the power consumption of the electrophoretic display panel is low, when the user uses only the side B of the display apparatus, the power consumption of the display apparatus can be reduced.

In the first state, the display panel 100 can be in the flat state, the foldable display apparatus can be also in the flat state, and the user can simultaneously view and use the first display area AA1 and the second display area AA2, such that a large screen display experience can be provided to the user.

In the second state, the display panel 100 can be in the bent state, the foldable display apparatus can be in the folded state, the user can separately view and use the first display area AA1 and the second display area AA2 according to different usage scenarios. The folded display apparatus is more portable and convenient for the user to put in a pocket or a bag.

In some embodiments, as shown in FIGS. 18 and 19, the display apparatus has the first mode and the second mode.

In the first mode, the first display area AA1 is in the display state, and the second display area AA2 is in the non-display state.

In the second mode, the first display area AA1 is in the non-display state, and the second display area AA2 is in the display state.

The present embodiment takes the mobile phone as an example of the foldable display apparatus. In the first mode, the first display area AA1 can be in the display state, and the user can view pictures, videos, or the like, displayed in the first display area AA1. The second display area AA2 does not perform the display function.

In the second mode, the second display area AA2 can be in the display state, and the user can view pictures, videos, or the like, displayed in the second display area AA2. The first display area AA1 does not perform the display function.

In some embodiments, the second mode can be the photographing mode or the chat mode. When the foldable display apparatus enables the camera component 200 to perform the photographing function, the user can observe the second display area AA2 to complete the selfie. When the user is chatting, the second display area AA2 can be in the display state to display text and image information, and the first display area AA1 can be in the non-display state to save power consumption of the foldable display apparatus.

Figure 20:
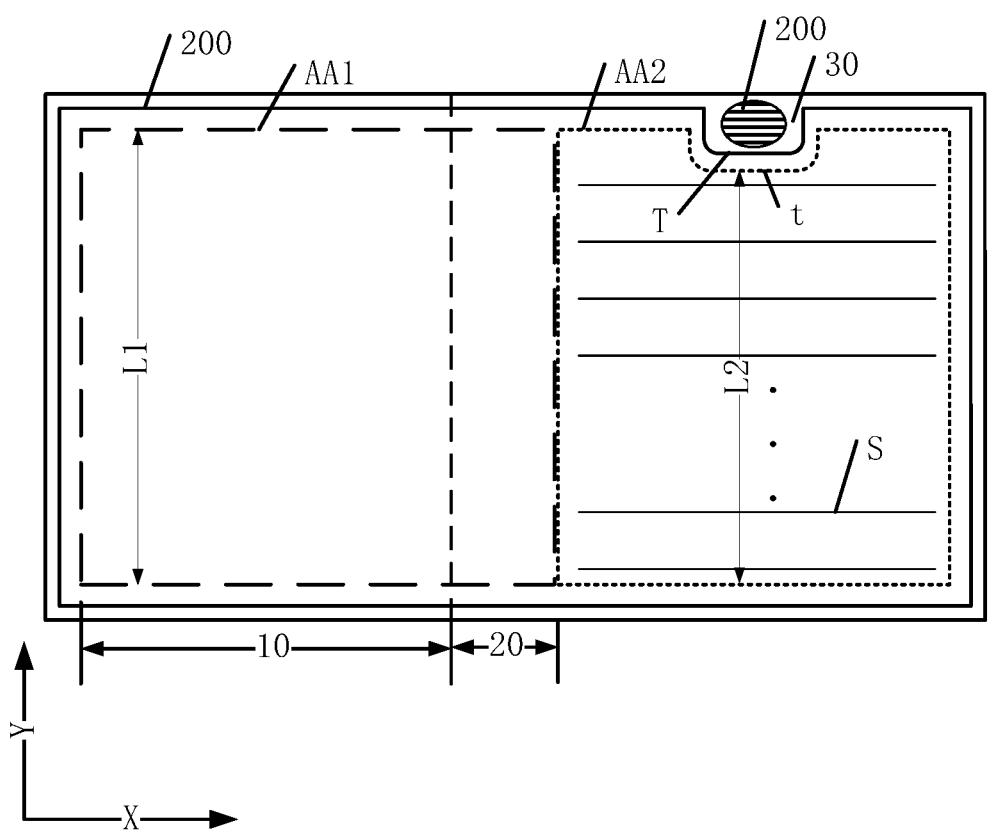
FIG. 20 is a schematic structure diagram of another exemplary foldable display apparatus in a flat state according to an embodiment of the present disclosure.

FIG. 20 is a schematic structure diagram of a foldable display apparatus in the flat state consistent with the disclosure. In some embodiments, as shown in FIG. 20, the display panel 100 includes the profiled edge T. The second display area AA2 includes the plurality of data lines S. The plurality of data lines S and the profiled edge T extend in the first direction X.

The profiled edge T is recessed toward the inside of the second display area AA2 to form the first notch 30.

The foldable display apparatus includes the camera component 200. The camera component 200 is arranged in the first notch 30.

In the present embodiment, the section of the edge t of the second display area AA2 is recessed inward to adapt to the shape of the first notch 30. The second display area AA2 half surrounds the first notch 30. Since the section of the edge t of the second display area AA2 is recessed inward, the minimum length L2 of the second display area AA2 is shorter than the maximum length L1 of the planar area 10. According to the present embodiment, the display panel 100 has the first notch 31 and the camera component 200 can be arranged in first notch 31 of the display apparatus. As such, the camera component 200 and the display panel 100 can be highly integrated in the display apparatus and the camera component 200 in the display apparatus does not occupy the space of the display panel on the side of the planar area 10, such that the display panel 100 at the side of the planar area 10 can realize the technical effect of the full screen for display.

Therefore, the display panel, the display apparatus, and the foldable display apparatus consistent with the present disclosure at least achieve the following beneficial effects.

The display apparatus can have two display areas, i.e., the first display area and the second display area. The first display area can include the planar area and the bending area. The lengths of the planar area and the second display area can be not identical. The maximum length L1 of the planar area along the second direction can be longer, and the minimum length L2 of the second display area along the second direction can be shorter, where L2<L1. Since the length of the second display area is shorter, when the display panel is arranged at the display apparatus, the display panel at the side of the second display area can have an shelf space for arranging electronic elements/devices in the display apparatus. As such, the electronic elements/devices and the display panel can be highly integrated in the display apparatus and the electronic elements/devices in the display apparatus do not occupy the space of the display panel on the side of the planar area, such that the display panel at the side of the planar area can realize the technical effect of the full screen for display.

It is intended that the disclosed embodiments are merely for illustration and not to limit the scope of the disclosure. Those skilled in the art will be appreciated that any modification or equivalents to the disclosed embodiments are intended to be encompassed within the scope of the present disclosure.

What is claimed is:

1. A display panel comprising:
    a first display area including a planar area and a bending area; and
    a second display area;
    wherein:
        the first display area and the second display area are arranged along a first direction;
        the planar area and the second display area are arranged at opposite sides of the bending area along the first direction;
        a width of the bending area is smaller than a maximum width of the planar area along the second direction, wherein the bending area is a display area and includes a second notch and a third notch arranged at opposite sides of the bending area in the second direction and penetrating through the first display area;
        when the bending area is in the bent state, the planar area and the second display area overlap each other in a third direction, and the bending area has a smooth display surface bending outwards;
        a maximum length of the planar area along a second direction is greater than a minimum length of the second display area along the second direction; and
        the first direction intersects and is perpendicular to the second direction.

2. The display panel of claim 1, wherein:
    the maximum width of the planar area along the first direction is substantially equal to a maximum width of the second display area along the first direction.

3. The display panel of claim 1, wherein:
    a direction perpendicular to the planar area is the third direction; and
    when the bending area is in the bent state, a display surface of the planar area and a display surface of the second display area face in opposite directions.

4. The display panel of claim 1, further comprising:
    a profiled edge extending along the first direction and recessing toward an inside of the second display area to form a first notch,
    wherein:
        the second display area includes a plurality of data lines extending along the first direction.

5. The display panel of claim 4, further comprising:
    a hollow part surrounded by the second display area.

6. The display panel of claim 1, wherein:
    a part of the display panel in the first display area is an organic light-emitting diode (OLED) display panel;
    at least a part of the display panel in the second display area includes an electrophoretic display panel; and
    the first display area and the second display area share a same substrate.

7. The display panel of claim 1, wherein the second display area includes:
    a first sub-area, in which a part of the display panel includes an OLED panel; and
    a second sub-area, in which a part of the display panel includes an electrophoretic display panel, wherein:
        the first sub-area and the second sub-area are arranged along the second direction.

8. The display panel of claim 1, further comprising:
    a stepped area, including a bonding area having a plurality of conductive pads, wherein the stepped area and the bending area are arranged at opposite sides of the planar area along the first direction.

9. The display panel of claim 8, wherein:
a direction perpendicular to the planar area is the third direction; and
when the stepped area is in a bent state, a part of the stepped area and the planar area overlap in the third direction.

10. The display panel of claim 1, wherein:
the second notch and the third notch pass through the display panel in a thickness direction of the display panel.

11. The display panel of claim 1, further comprising:
a non-display area arranged around the first display area and the second display area, wherein:
 an area of the first display area is S1, an area of the second display area is S2, an area of the non-display area is S3, and a screen ratio S1+S2/S1+S2+S3 is about 95% or greater.

12. A display apparatus comprising:
a camera component; and
a display panel, including:
 a first display area including a planar area and a bending area; and
 a second display area,
wherein:
 the first display area and the second display area are arranged along a first direction;
 the planar area and the second display area are arranged at opposite sides of the bending area along the first direction;
 a width of the bending area is smaller than a maximum width of the planar area along the second direction, wherein the bending area is a display area and includes a second notch and a third notch arranged at opposite sides of the bending area in the second direction and penetrating through the first display area;
 a maximum length of the planar area along a second direction is greater than a minimum length of the second display area along the second direction;
 the first direction intersects and is perpendicular to the second direction;
 when the bending area is in the bent state, the planar area and the second display area overlap each other in a third direction perpendicular to the planar area, and the bending area has a smooth display surface bending outwards;
 the camera component and the second display area are arranged at a same side of the planar area; and
 a lens of the camera component is arranged at a side of the camera component away from the planar area.

13. The apparatus of claim 12, wherein:
the display apparatus has a first mode and a second mode;
in the first mode, the first display area is in a display state, and the second display area is in a non-display state; and
in the second mode, the first display area is in the non-display state, and the second display area is in the display state.

14. The apparatus of claim 13, wherein:
the second mode is a photographing mode or a chat mode.

15. The apparatus of claim 12, wherein:
the display panel includes a profiled edge;
the second display area includes a plurality of data lines;
the plurality of data lines and the profiled edge extend in the first direction;
the profiled edge is recessed toward an inside of the second display area to form a first notch; and
the camera component is arranged in the first notch.

16. The apparatus of claim 12, further comprising:
a cover plate, one-piece molded and having a U-shape cross section;
wherein:
 the display panel includes a light-exiting surface and a bottom surface opposite to the light-exiting surface;
 the cover plate is arranged at a side of the light-exiting surface away from the bottom surface; and
 the cover plate covers the light-exiting surface.

17. A foldable display apparatus, comprising:
a display panel including:
 a first display area including a planar area and a bending area; and
 a second display area, wherein:
  the first display area and the second display area are arranged along a first direction;
  the planar area and the second display area are arranged at opposite sides of the bending area along the first direction;
  a width of the bending area is smaller than a maximum width of the planar area along the first direction, wherein the bending area is a display area and includes a second notch and a third notch arranged at opposite sides of the bending area in the second direction and penetrating through the first display area;
  a maximum length of the planar area along a second direction is greater than a minimum length of the second display area along the second direction;
  the first direction intersects the second direction;
  in a first state of the foldable display apparatus, the first display area and the second display area of the display panel are arranged at a same plane; and
  in a second state of the foldable display apparatus, when the bending area is in the bent state, the planar area and the second display area overlap each other in a third direction perpendicular to the planar area, and the bending area has a smooth display surface bending outwards.

18. The apparatus of claim 17, wherein:
the display apparatus has a first mode and a second mode;
in the first mode, the first display area is in a display state and the second display area is in a non-display state; and
in the second mode, the first display area is in the non-display state and the second display area is in the display state.

19. The apparatus of claim 18, wherein:
the second mode is a photographing mode or a chat mode.

20. The apparatus of claim 17, wherein:
the display panel includes a profiled edge;
the second display area includes a plurality of data lines;
the plurality of data lines and the profiled edge extend along the first direction;
the profiled edge is recessed toward an inside of the second display area to form a first notch; and
the apparatus further comprises:
 a camera component arranged in the first notch.

* * * * *